US008559385B2

(12) United States Patent
McCoy

(10) Patent No.: US 8,559,385 B2
(45) Date of Patent: *Oct. 15, 2013

(54) TECHNIQUES FOR CHANNEL SOUNDING IN A WIRELESS COMMUNICATION SYSTEM

(75) Inventor: James W. McCoy, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,179

(22) Filed: Oct. 17, 2011

(65) Prior Publication Data

US 2012/0033636 A1    Feb. 9, 2012

Related U.S. Application Data

(63) Continuation of application No. 12/057,514, filed on Mar. 28, 2008.

(51) Int. Cl.
H04W 4/00      (2009.01)
H04W 28/04     (2009.01)

(52) U.S. Cl.
CPC ............................. H04W 28/04 (2013.01)
USPC .................................. 370/329; 370/341

(58) Field of Classification Search
USPC ................................................... 370/329
See application file for complete search history.

(56) References Cited

U.S. PATENT DOCUMENTS

| 7,701,919 | B2* | 4/2010 | Ah Lee ............................ 370/344 |
| 2007/0183386 | A1* | 8/2007 | Muharemovic et al. ...... 370/344 |
| 2008/0043708 | A1* | 2/2008 | Muharemovic et al. ...... 370/348 |
| 2008/0101507 | A1* | 5/2008 | Oketani et al. ................ 375/343 |
| 2008/0187027 | A1* | 8/2008 | Malladi ........................... 375/135 |
| 2008/0298433 | A1* | 12/2008 | Tiirola et al. ................... 375/132 |
| 2008/0298477 | A1* | 12/2008 | Classon .......................... 375/260 |
| 2008/0318608 | A1* | 12/2008 | Inoue et al. .................... 455/509 |
| 2009/0042615 | A1* | 2/2009 | Teo et al. ..................... 455/562.1 |
| 2009/0046645 | A1 | 2/2009 | Bertrand et al. |
| 2009/0181687 | A1 | 7/2009 | Tiirola et al. |
| 2009/0239476 | A1* | 9/2009 | Womack et al. ................ 455/68 |
| 2010/0008333 | A1* | 1/2010 | Kim et al. ...................... 370/336 |
| 2010/0329220 | A1 | 12/2010 | Kim et al. |

* cited by examiner

Primary Examiner — Derrick Ferris
Assistant Examiner — Shaq Taha
(74) Attorney, Agent, or Firm — Paradigm IP Law, PC; Ross L. Franks

(57) ABSTRACT

A technique of operating a wireless communication device includes receiving an assigned starting point index and an assigned reference signal bandwidth for a reference signal. The reference signal is then transmitted multiple times, beginning at an initial resource block that is associated with the assigned starting point index and in accordance with the assigned reference signal bandwidth, across a shared channel.

15 Claims, 3 Drawing Sheets

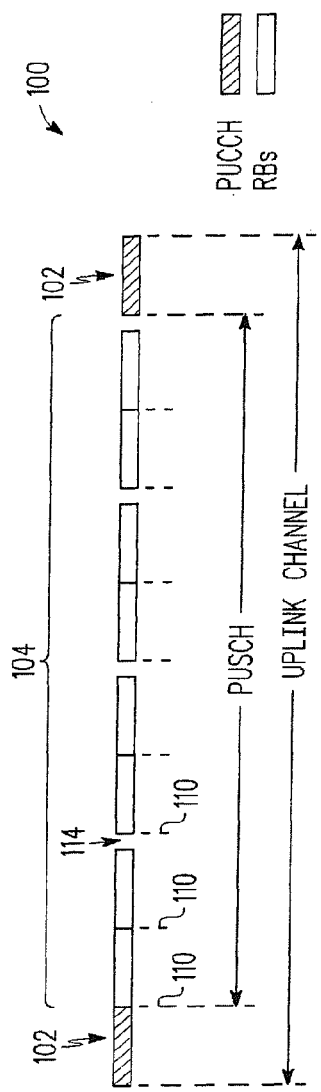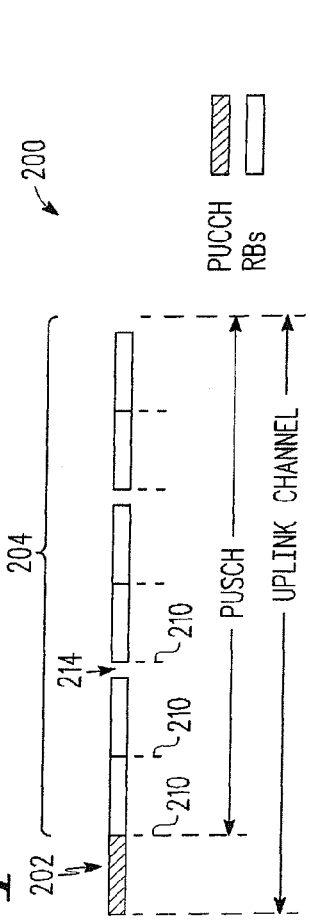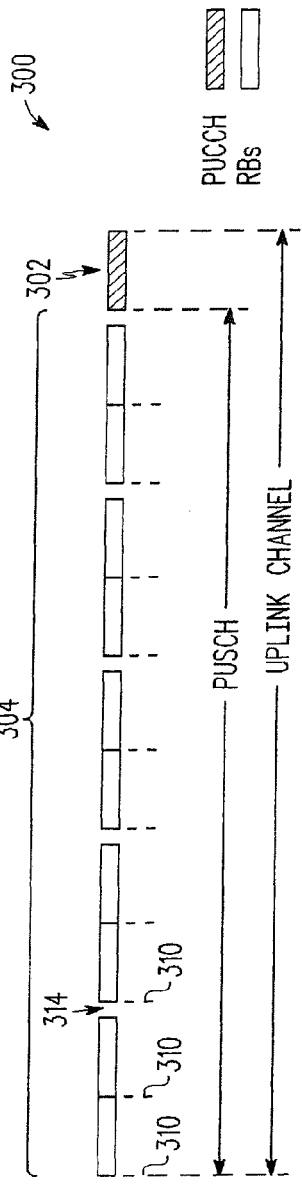

TECHNIQUES FOR CHANNEL SOUNDING IN A WIRELESS COMMUNICATION SYSTEM

PRIORITY AND CROSS-REFERENCE TO RELATED APPLICATIONS

This application is a continuation of and claims priority to a co-owned and co-pending U.S. patent application Ser. No. 12/057,514, entitled "TECHNIQUES FOR CHANNEL SOUNDING IN A WIRELESS COMMUNICATION SYSTEM", filed Mar. 28, 2008, and is related to a U.S. patent application Ser. No. 13/233,539, entitled "APPARATUS AND METHODS FOR WIRELESS CHANNEL SOUNDING" filed on Sep. 15, 2011, each of the foregoing incorporated herein by reference in its entirety.

BACKGROUND

1. Field

This disclosure relates generally to channel sounding and, more specifically, to techniques for channel sounding in a wireless communication system.

2. Related Art

Various wireless networks have used an estimated received signal strength and an estimated carrier to interference and noise ratio (CINR) of a received signal to determine operational characteristics of the networks. As one example, IEEE 802.16e compliant mobile stations (MSs) are required to estimate a received signal strength indicator (RSSI) and a CINR of a received signal. The RSSI associated with a serving base station (BS) may be used by an MS for cell re-selection and the CINR, which is reported to the serving BS, may be used by the serving BS to adapt a downlink transmission rate to link conditions.

Accurate reported CINRs are desirable, as inaccurate reported CINRs may impact performance of a wireless network. For example, reporting a CINR that is above an actual CINR may decrease network throughput due to frame re-transmission, while reporting a CINR that is below the actual CINR may cause the serving BS to schedule data rates below a supportable data rate. According to IEEE 802.16e, RSSI and CINR estimates at an MS are derived based on a preamble signal, which is an orthogonal frequency division multiple access (OFDMA) symbol that is transmitted at the beginning of each OFDMA frame.

Wireless networks that employ third-generation partnership project long-term evolution (3GPP-LTE) compliant architectures are currently required to employ uplink sounding reference signals (RSs) for uplink CINR estimation, which is used by the network to schedule uplink transmission for user equipment (subscriber stations (SSs)). Respective sequences of the RSs are used to uniquely identify an SS and, when transmitted from the SS to a serving base station (BS), may be used by the serving BS in channel characterization. A known channel sounding (channel characterization) approach has proposed limiting a channel sounding bandwidth of cell-edge SSs, i.e., SSs operating at or near an edge of a cell, to reduce interference with neighboring cells and to improve uplink CINR estimation. In this approach, cell-edge SSs sound a portion of a system bandwidth in one sounding symbol and employ frequency hopping to cover the entire system bandwidth using multiple sounding symbols. Following this approach, non-cell-edge SSs are allowed to sound the entire system bandwidth with a single sounding symbol. In general, the above-described approach increases system bandwidth requirements (due to increased scheduling overhead), results in increased inter-cell interference (due to higher power spectral density (PSD) associated with narrower bandwidths), and does not generally improve channel estimation accuracy.

Various other proposals have advocated employing multiple sounding bandwidths, one of which is selected by a scheduler, for sounding a UL channel associated with an SS. As currently agreed, 3GPP-LTE compliant BSs are configured to signal a number of associated channel sounding control bits (to SSs) on a physical downlink control channel (PDCCH). The SSs decode the channel sounding control bits to determine an appropriate sounding RS for transmission. The channel sounding control bits may specify parameters such as a sounding bandwidth (BW), a cyclic shift (CS), and a hopping pattern (HP), among other signal characteristics, to designate a particular sounding RS for transmission from a given SS.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1 is a frequency diagram of an example uplink (UL) channel that includes a physical uplink control channel (PUCCH) that is divided by a physical uplink shared channel (PUSCH) that is sounded according to one aspect of the present invention.

FIG. 2 is a frequency diagram of another example UL channel that includes a PUCCH (at one end of the UL channel) and a PUSCH that is sounded according to another aspect of the present invention.

FIG. 3 is a frequency diagram of yet another example UL channel that includes a PUCCH (at an opposite end of the UL channel as contrasted with the UL channel of FIG. 2) and a PUSCH that is sounded according to yet another aspect of the present invention.

DETAILED DESCRIPTION

Figure 5:
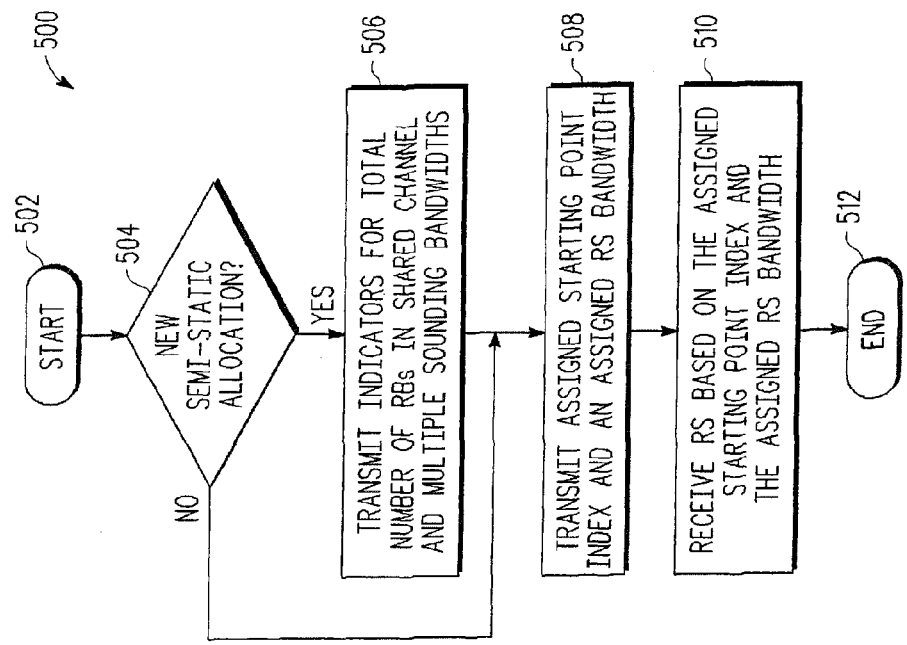
FIG. 5 is a flowchart of an example channel sounding technique employed by a serving base station (BS), according to another embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a subscriber station, such as a cellular handset, it will be appreciated that the present invention is not so limited and may be embodied in various wireless communication devices.

As used herein, the term "channel" includes one or more subcarriers, which may be adjacent or distributed across a frequency band. Moreover, the term "channel" may include an entire system bandwidth or a portion of the entire system bandwidth. The term, "resource block," as used herein, includes a number of subcarriers (e.g., twelve subcarriers) which may or may not be adjacent. As used herein, the term "reference signal" may correspond to a demodulation or a sounding reference (RS) signal. As used herein, the term "demodulation RS" means an RS that is assigned to (and transmitted by) a subscriber station (SS), received by a serving base station (BS), and used by the serving BS for channel estimation. As used herein, the term "sounding RS" means an RS that is assigned to (and transmitted by) an SS, received by a serving BS, and used by a scheduler to assign a UL channel to the SS. As is used herein, the terms "wide-bandwidth" and "narrow-bandwidth" are relative terms with a "wide-bandwidth" RS having more assigned resource blocks (RBs) than a "narrow-bandwidth" RS. As is also used herein, the term "subscriber station" is synonymous with the term "user equipment," which includes a wireless communication device that may (or may not) be mobile.

A demodulation RS is associated with transmission of uplink data and/or control signals. In contrast, a sounding RS is not usually associated with uplink data transmission. Usually, a demodulation RS is used to estimate a UL shared channel before decoding data transmitted on the UL shared channel. In this case, the demodulation RS has the same bandwidth as the data and occupies the same set of subcarriers as the data. UL RSs may be based on Zadoff-Chu (ZC) sequences, which are non-binary unit-amplitude sequences. Typically, ZC sequences have ideal cyclic autocorrelation and, as such, ZC sequences are constant amplitude zero autocorrelation (CAZAC) sequences. Cyclic shifted versions of a ZC sequence have low cross-correlation, which allows the impact of an interfering signal to be evenly spread in the time-domain, after correlating the received signal with a desired ZC sequence. In general this allows for more reliable detection of a desired channel.

Typically, channel sounding symbols scheduled at a same time for different SSs are configured to be orthogonal when the channel sounding symbols are assigned to a same channel. That is, when multiple SSs are scheduled to transmit channel sounding symbols over the same channel (i.e., group of subcarriers), the scheduled channel sounding symbols for each of the multiple SSs are configured as code division multiplexed (CDM) sequences. The CDM sequences may be generated by cyclic shift of one or more base sequences. In general, a length of the cyclic shift may be based on a typical time delay spread associated with the SSs in a cell. For example, in a wireless communication system having a typical time delay spread of five microseconds and a sampling frequency of 7.68 MHz, a cyclic shift of forty may be employed. The CDM sequences may be, for example, CAZAC sequences, generated in a number of ways, which are not particularly relevant to the present disclosure and, as such, is not discussed further herein.

In general, a length of an RS ($r_u(n)$) is determined by a length of a discrete Fourier transform (DFT), e.g., a fast Fourier transform (FFT), that is used for the RS (i.e., the number of subcarriers employed). For example, when an RS is assigned one resource block (e.g., twelve subcarriers in the frequency-domain), eleven basis sequences may be generated using a cyclic extension approach, i.e., $r_u(n)$, $0 \le u \le 10$, $0 \le n \le NFFT-1$, where NFFT is the size of the DFT. From each basis, twelve orthogonal sequences may be generated using a cyclic shift in the frequency-domain. An uplink transmitter of an SS may implement one of a phase shift keying (PSK), a quadrature amplitude modulation (QAM), or other data modulation scheme, depending upon which modulation scheme is scheduled. It should be appreciated that any of the various PSK, e.g., pi/2 BPSK, QPSK and 8-PSK, or QAM, e.g., 16-QAM and 64-QAM, modulation techniques may be implemented in a wireless communication system constructed according to the present disclosure.

It should be appreciated that the time period over which an SS is scheduled to transmit a sounding RS should generally be less than a coherence time of a UL shared channel (i.e., a time over which the UL shared channel is stable). Moreover, a bandwidth assigned to the sounding RS should include enough subcarriers such that code division multiplexing can be employed for the sounding RSs transmitted by the SSs (for example, twelve subcarriers are typically required to implement CDM for the UL channel). The channel sounding symbols transmitted by the different SSs should usually be orthogonal, such that multiple SSs can transmit sounding RSs simultaneously over the same channel (group of subcarriers) without interference. A serving BS can then receive the respective sounding RSs transmitted by respective SSs and accurately determine channel characteristics based on the received sounding RSs.

According to various aspects of the present disclosure, uplink (UL) channel sounding signaling techniques are employed that generally reduce scheduling overhead associated with sounding a UL shared channel of a wireless communication system. The UL channel sounding techniques facilitate sounding across an entire physical uplink shared control channel (PUSCH) of a UL channel irrespective of the number of RBs in the PUSCH (whether all RBs of the PUSCH are sounded will depend upon an assigned sounding bandwidth and a number of RBs in the PUSCH). For example, a UL having a bandwidth of 20 MHz may include a wide variety of RBs (e.g., 110 RBs, 100 RBs, or 97 RBs) in a PUSCH that require sounding, depending on a duplex spacing and how many RBs are assigned to a physical uplink control channel (PUCCH).

The techniques disclosed herein may be advantageously employed in a wide variety of communication systems where a bandwidth of an uplink shared control channel changes (expands or contracts) over time on a semi-static basis (e.g., as a bandwidth requirement for an uplink control channel changes). The disclosed techniques are contemplated to be applicable to systems that employ a variety of signaling techniques (e.g., orthogonal frequency division multiplex (OFDM), single-carrier frequency division multiple access (SC-FDMA), etc.) on a communication channel (e.g., a UL channel). In general, to support channel dependent UL scheduling and closed-loop power control, it is usually desirable to sound an entire UL shared channel bandwidth.

According to one aspect of the present disclosure, a scheduler is configured to periodically assign (on a semi-static basis) multiple sounding bandwidths (e.g., two different sounding bandwidths (i.e., a wide-bandwidth RS and a narrow-bandwidth RS)) for a UL shared channel and a total bandwidth of a UL shared channel. In addition to scheduling the multiple sounding bandwidths and the total bandwidth, the scheduler is configured to assign an initial starting point index and a sounding bandwidth for an RS. For example, the scheduler may determine a total number of starting point indices ($N_{SP}$) as follows:

$$N_{SP} = \text{floor}(N_{SCH}/N_{BW1})$$

where $N_{SCH}$ is the number of RBs in the UL shared channel and $N_{BW1}$ is the number of RBs in a first sounding bandwidth (e.g., a narrowest sounding bandwidth). Starting point RBs ($i_{SP}$) may then be determined as follows:

$$i_{SP} = \text{floor}(k*(N_{SCH}/N_{SP}))$$

where k is the starting point index (k is an element of (0, 1, ..., $N_{SP}$−1). In this case, an SS is configured to sound a UL shared channel starting at an RB associated with an initial starting point index (provided by the scheduler and transmitted by a serving BS) and according to an assigned hopping pattern (HP).

The SS then sounds across the entire UL shared channel (or a configured portion of the UL shared channel) by hopping from one starting point RB to a next starting point RB (e.g., the SS may hop from consecutive starting point RBs). In at least one embodiment, the SS determines an initial starting point RB based on a narrowest sounding bandwidth and determines other starting point RBs based on an assigned sounding bandwidth (i.e., the SS re-calculates the total number of starting points based on the assigned sounding bandwidth). In at least one other embodiment, the SS determines the initial starting point RB based on an assigned sounding bandwidth and determines other starting point RBs based on the assigned sounding bandwidth.

As one example, assuming that an uplink shared channel includes one-hundred RBs (i.e., $N_{SCH}$=100) and a sounding bandwidth includes twelve RBs (i.e., $N_{BW1}$=12), a total number of starting point indices ($N_{SP}$) is equal to eight (i.e., floor(100/12)=floor(8.5)). In this case, the starting point indices range from zero to seven (i.e., k is an element of (0, 1, ... 7)). Assuming an initial starting point index of three, a sounding bandwidth of twelve RBs and that indices are incremented in order (i.e., k=3,4,5,6,7,0,1,2), the initial starting point RB is thirty-seven (i.e., $i_{SP}$=floor(3*(100/8))=floor(37.5)=37). A second starting point RB is fifty (i.e., $i_{SP}$=floor(4*(100/8))=floor(50)=50) and a third starting point RB is sixty-two (i.e., $i_{SP}$=floor(5*(100/8))=floor(62.5)=62). A fourth starting point RB is seventy-five (i.e., $i_{SP}$=floor(6*(100/8))=floor(75)=75) and a fifth starting point RB is eighty-seven (i.e., $i_{SP}$=floor(7*(100/8))=floor(87.5)=87). A sixth starting point RB is zero (i.e., $i_{SP}$=floor(0*(100/8))=floor(0)=0) and a seventh starting point RB is twelve (i.e., $i_{SP}$=floor(1*(100/8))=floor(12.5)=12). An eighth (and final) starting point RB is twenty-five (i.e., $i_{SP}$=floor(2*(100/8))=floor(25)=25). In this case, the SS transmits a sounding RS on RBs 0-11, 12-23, 25-36, 37-48, 50-61, 62-73, 75-86, and 87-98 and skips RBs 24, 49, 74, and 99.

While in this case there are holes in the UL shared channel that are not sounded, in a typical case, a channel quality of the RBs associated with the holes may be adequately estimated based on adjacent RBs that are sounded as the holes are distributed across the UL shared channel. For example, a channel quality of an RB associated with a hole may be estimated based on an average of the channel quality of the RBs on opposite sides of the RB associated with the hole. In the case of eight starting point indices, three control bits are required to signal which of the starting point indices is the initial starting point index. It should be appreciated that the number of control bits required to signal an initial starting point index is based on a total number of starting point indices. For example, in a system that employs two starting point indices, only one control bit is required to signal an initial starting point index. As another example, in a system that employs four starting point indices, only two control bits are required to signal an initial starting point index.

As another example, assuming that a UL shared channel includes one-hundred RBs (i.e., $N_{SCH}$=100) and a sounding bandwidth includes sixteen RBs (i.e., $N_{BW1}$=16), the total number of starting point indices ($N_{SP}$) is equal to six (i.e., floor(100/16)=floor(6.25)). In this case, the starting point indices range from zero to five (i.e., k is an element of (0, 1, ... 5)). Assuming an initial starting point index of three and that indices are incremented in order (i.e., k=3,4,5,0,1,2), the initial starting point RB is fifty (i.e., $i_{SP}$=floor(3*(100/6))=floor(50)=50). A second starting point RB is sixty-six (i.e., $i_{SP}$=floor(4*(100/6))=floor(66.67)=66) and a third starting point RB is eighty-three (i.e., $i_{SP}$=floor(5*(100/6))=floor(83.33)=83). A fourth starting point RB is zero (i.e., $i_{SP}$=floor(0*(100/6))=floor(0)=0) and a fifth starting point RB is sixteen (i.e., $i_{SP}$=floor(1*(100/6))=floor(16.67)=16). A sixth (and final) starting point RB is thirty-three (i.e., $i_{SP}$=floor(2*(100/6))=floor(33.33)=33). In this case, the SS transmits a sounding RS on RBs 0-15, 16-31, 33-48, 50-65, 66-81, and 83-98 and skips RBs 32, 49, 82, and 99. While in this case there are also holes in the UL shared channel that are not sounded, in a typical case, a channel quality of the RBs associated with the holes may also be adequately estimated based on adjacent RBs that are sounded. In the case of six starting point indices, three control bits are required to signal which of the starting point indices is the initial starting point index.

According to one embodiment of the present disclosure, a technique for operating a wireless communication device (e.g., an SS) includes receiving an assigned starting point index and an assigned reference signal bandwidth for a reference signal. The reference signal is then transmitted multiple times, beginning at an initial resource block that is associated with the assigned starting point index and in accordance with the assigned reference signal bandwidth across a shared channel.

According to another embodiment of the present disclosure, a technique for operating a wireless communication device (e.g., a BS) includes transmitting an assigned starting point index and an assigned reference signal bandwidth for a reference signal. The reference signal is then received multiple times, beginning at an initial resource block that is associated with the assigned starting point index and in accordance with the assigned reference signal bandwidth across a shared channel.

According to yet another embodiment of the present disclosure, a wireless communication device includes a scheduler coupled to a transceiver. The scheduler is configured to assign a starting point index and an assigned reference signal bandwidth for a reference signal. The transceiver is configured to transmit the assigned starting point index and the assigned reference signal bandwidth for the reference signal. The transceiver is also configured to receive, beginning at an initial resource block that is associated with the assigned starting point index and in accordance with the assigned reference signal bandwidth, the reference signal multiple times.

With reference to FIG. 1, an example UL channel 100 for an SS includes a physical uplink control channel (PUCCH) 102 that is separated by a physical uplink shared channel (PUSCH) 104 (i.e., portions of the PUCCH 102 are at opposite ends of the UL channel). As previously noted, the SS is configured to transmit sounding RSs to a serving BS such that a scheduler may determine which RBs to assign to the SS for UL communication. As noted above, a total number of RBs assigned to a UL channel are semi-static (i.e., do not change for a relatively long time period). While the total number of RBs assigned to a UL channel 100 are semi-static, RBs assigned to the PUCCH 102 (and conversely the PUSCH 104) may frequently change based on operational requirements of a wireless communication system.

In various situations, it is desirable to only sound the PUSCH 104 (as opposed to sounding both the PUSCH 104 and the PUCCH 102). As noted above, the number of RBs assigned to a UL channel may not be consistent for a given system bandwidth. For example, as noted above, a 20 MHz system bandwidth may correspond to 97 RBs, 100 RBs, or 110 RBs. As another example, a 5 MHz system bandwidth may correspond to 22 RBs, 25 RBs, or 28 RBs. In the UL channel 100, eight starting point indices 110 are illustrated. It should be noted that a number of holes 114 (including RBs that are not sounded) are illustrated. Depending upon the number of RBs in a UL shared channel and the number of RBs in a sounding RS, the holes 114 may or may not be present.

When the holes 114 are present, the holes 114 are distributed across the PUSCH 104 (a fractional part of an RB accumulates similar to a frac-N synthesizer) when starting point indices are calculated based on the above formula. As noted above, a scheduler is configured to assign (on a semi-static basis) multiple sounding bandwidths (e.g., two different sounding bandwidths (i.e., a wide-bandwidth RS and a narrow-bandwidth RS) for a UL channel and a total bandwidth of a UL channel. Between changing the multiple sounding bandwidths and the total bandwidth, when channel sounding is warranted (e.g., when the PUCCH 102 is expanded or contracted), the scheduler is configured to assign an initial starting point index and a selected sounding bandwidth for a sounding RS.

In response to receiving the initial starting point index and the selected sounding bandwidth, the SS proceeds with sounding the PUSCH 104 (from the initial starting point index) according to an assigned hopping pattern. The SS may, for example, sound the entire PUSCH 104 or a configured portion of the PUSCH 104. For example, if a portion of the PUSCH 104 is only assigned to voice communication (as contrasted with being assigned to data communication or voice and data communication), the portion of the PUSCH 104 that is only assigned to voice communication may not be sounded (in this case, a desired voice quality may be achieved by, for example, frequency diversity using hopping).

With reference to FIG. 2, an example UL channel 200 for an SS includes a PUCCH 202 and a PUSCH 204. As previously noted, the SS is configured to transmit sounding RSs to a serving BS such that a scheduler may determine which RBs to assign to the SS for UL communication. As noted above, a total number of RBs assigned to the UL channel 200 are semi-static (i.e., do not change for a relatively long time period). While the total number of RBs assigned to the UL channel 200 are semi-static, RBs assigned to the PUCCH 202 (and conversely the PUSCH 204) may change based on operational requirements of a wireless communication system.

In the UL channel 200 illustrated in FIG. 2, six starting point indices 210 are illustrated in the PUSCH 204. As noted above, a scheduler is configured to assign (on a semi-static basis) multiple sounding bandwidths for a UL channel and a total bandwidth of a UL shared channel. Between changing the multiple sounding bandwidths and the total bandwidth, when channel sounding is warranted (e.g., when the PUCCH 202 is expanded or contracted), the scheduler is configured to assign an initial starting point index and a selected sounding bandwidth for a sounding RS. In response to receiving the initial starting point index and the selected sounding bandwidth, the SS proceeds with sounding the PUSCH 204 (from the initial starting point index) according to an assigned hopping pattern. The SS may, for example, sound the entire PUSCH 204 or a configured portion of the PUSCH 204.

With reference to FIG. 3, an example UL channel 300 for an SS includes a PUCCH 302 and a PUSCH 304. As previously noted, the SS is configured to transmit sounding RSs to a serving BS such that a scheduler may determine which RBs to assign to the SS for UL communication. As noted above, a total number of RBs assigned to a UL channel 300 are semi-static. While the total number of RBs assigned to the UL channel 300 are semi-static, RBs assigned to the PUCCH 302 (and conversely the PUSCH 304) may change based on operational requirements of a wireless communication system. Moreover, the number of RBs assigned to a UL shared channel may not be consistent for a given system bandwidth. In the UL channel 300, ten starting point indices 310 are illustrated. As noted above, a scheduler is configured to assign (on a semi-static basis) multiple sounding bandwidths for a UL channel and a total bandwidth of a UL shared channel. Between changing the multiple sounding bandwidths and the total bandwidth, when channel sounding is warranted (e.g., when the PUCCH 302 is expanded or contracted), the scheduler is configured to assign an initial starting point index and a selected sounding bandwidth for a sounding RS. In response to receiving the initial starting point index and the selected sounding bandwidth, the SS proceeds with sounding the PUSCH 304 (from the initial starting point index) according to an assigned hopping pattern. The SS may, for example, sound the entire PUSCH 304 or a configured portion of the PUSCH 304.

Figure 4:
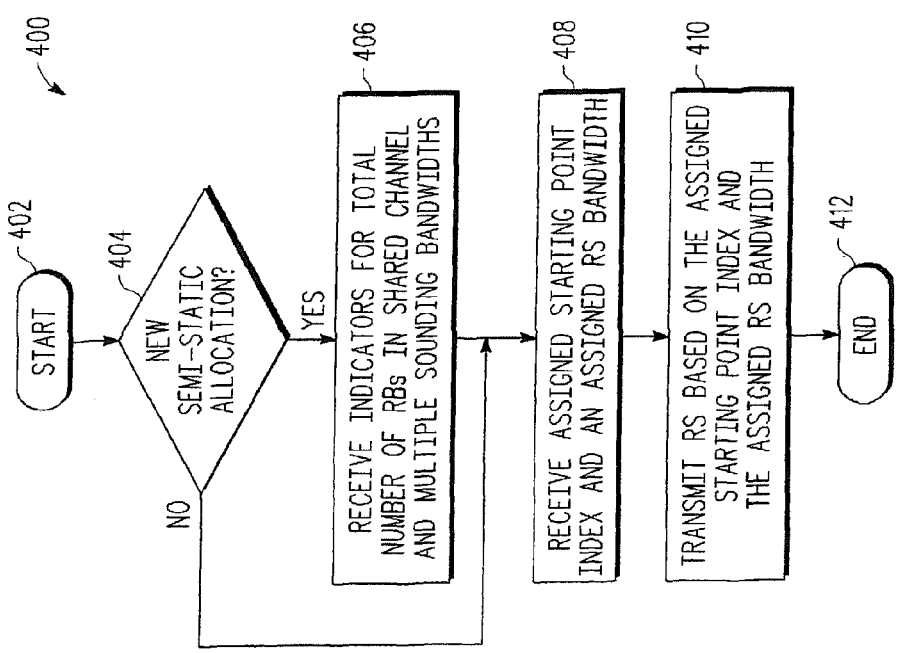
FIG. 4 is a flowchart of an example channel sounding technique employed by a subscriber station (SS), according to one embodiment of the present invention.

Turning to FIG. 4, a channel sounding process 400, that may be employed in an SS of a wireless communication system, is depicted. The process 400 is initiated at block 402, at which point control transfers to decision block 404. In block 404, the SS determines whether a new semi-static allocation has occurred. If a new semi-static allocation is not received in block 404, control transfers to block 408. If a new semi-static allocation occurs in block 404, control transfers to block 406. In block 406, the new semi-static allocation, which includes a number of indicators (e.g., of a total number of resource blocks (RBs) in a UL shared channel, a first channel sounding bandwidth, a second channel sounding bandwidth, etc.), is received. It should be appreciated that the new semi-static allocation may be received in one or more transmissions.

Next, in block 408, the SS receives an assigned starting point index and an assigned RS bandwidth for an RS (e.g., from a scheduler associated with a serving BS). Then, in block 410, the SS determines an initial RB that is associated with the assigned starting point index and begins transmitting (e.g., across a UL shared channel) the reference signal in accordance with the assigned reference signal bandwidth until the UL shared channel is substantially sounded. Depending on the assigned RS bandwidth and a total number of RBs in the UL shared channel, holes in sounding coverage may be distributed across the UL shared channel. Following block 410, control transfers to block 412, where control returns to a calling process.

Turning to FIG. 5, a channel sounding process 500, that may be employed in a serving BS of a wireless communication system, is depicted. The process 500 is initiated at block 502, at which point control transfers to decision block 504. In block 504, the serving BS determines whether a new semi-static allocation is received. If a new semi-static allocation is not received in block 504, control transfers to block 508. If a new semi-static allocation is received in block 504, control transfers to block 506. In block 506, the new semi-static allocation, which includes a number of indicators (e.g., of a total number of RBs in a UL shared channel, a first channel sounding bandwidth, a second channel sounding bandwidth, etc.), is received from a scheduler and transmitted in one or more symbols. Next, in block 508, the serving BS receives an assigned starting point index and an assigned reference signal bandwidth for a reference signal (e.g., from a scheduler associated with the serving BS) and transmits the information to the SS. Then, in block 510, the serving BS receives (e.g., across the UL shared channel) the RS in accordance with the assigned RS bandwidth.

When the RS is a sounding RS, a scheduler associated with the BS may utilize the sounding RS to assign a UL channel to the SS based on a channel quality associated with the sounding RS for different RB groups. That is, the scheduler utilizes the sounding RS to determine which sounded RBs provide, for example, a desired channel quality. As noted above, a channel quality associated with RBs that are not sounded may be estimated based on adjacent RBs that are sounded. The channel quality for RBs that are not sounded may be, for example, estimated based on an average channel quality of adjacent RBs or may be determined through interpolation of adjacent RBs on opposite sides of the RBs that are not sounded. Depending on the assigned RS bandwidth and a total number of RBs in a shared channel, holes in sounding coverage may be distributed across the shared channel. Following block 510, control transfers to block 512, where control returns to a calling process.

Figure 6:
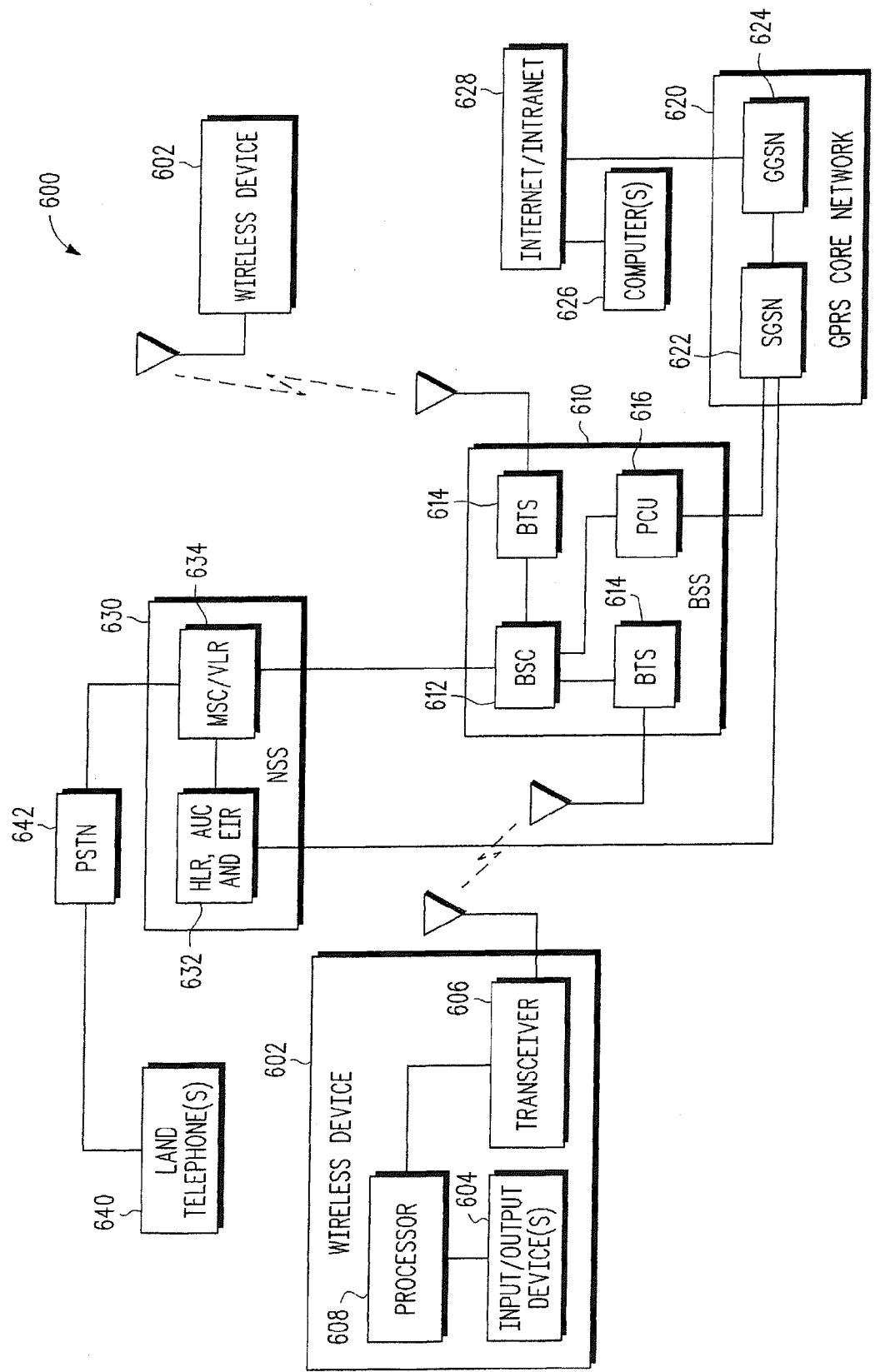
FIG. 6 is a block diagram of an example wireless communication system that may sound a UL shared channel according to various embodiments of the present invention.

With reference to FIG. 6, an example wireless communication system 600 is depicted that includes a plurality of subscriber stations or wireless devices 602, e.g., hand-held computers, personal digital assistants (PDAs), cellular telephones, etc., that may implement communication links according to one or more embodiments of the present disclosure. In general, the wireless devices 602 include a processor 608 (e.g., a digital signal processor (DSP)), a transceiver 606, and one or more input/output devices 604 (e.g., a camera, a keypad, display, etc.), among other components not shown in FIG. 6. As is noted above, according to various embodiments of the present disclosure, techniques are disclosed that generally reduce overhead (e.g., control bits) associated with signaling reference signals. The wireless devices 602 communicate with a base station controller (BSC) 612 of a base station subsystem (BSS) 610, via one or more base transceiver stations (BTS) 614, to receive or transmit voice and/or data and control signals. To facilitate communication, the wireless devices 602 may execute the process 400 of FIG. 4 and the BSC 612 may execute the process 500 of FIG. 5. The BSC 612 may, for example, employ a scheduler for assigning one or more RSs to each of the wireless devices 602. In general, the BSC 612 may also be configured to choose a modulation and coding scheme (MCS) for each of the devices 602, based on channel conditions.

The BSC 612 is also in communication with a packet control unit (PCU) 616, which is in communication with a serving general packet radio service (GPRS) support node (SGSN) 622. The SGSN 622 is in communication with a gateway GPRS support node (GGSN) 624, both of which are included within a GPRS core network 620. The GGSN 624 provides access to computer(s) 626 coupled to Internet/intranet 628. In this manner, the wireless devices 602 may receive data from and/or transmit data to computers coupled to the Internet/intranet 628. For example, when the devices 602 include a camera, images may be transferred to a computer 626 coupled to the Internet/intranet 628 or to another one of the devices 602. The BSC 612 is also in communication with a mobile switching center/visitor location register (MSC/VLR) 634, which is in communication with a home location register (HLR), an authentication center (AUC), and an equipment identity register (EIR) 632. In a typical implementation, the MSC/VLR 634 and the HLR, AUC, and EIR 632 are located within a network and switching subsystem (NSS) 630, which performs various functions for the system 600. The SGSN 622 may communicate directly with the HLR, AUC, and FIR 632. As is also shown, the MSC/VLR 634 is in communication with a public switched telephone network (PSTN) 642, which facilitates communication between wireless devices 602 and land telephone(s) 640.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device or by copying the code from the storage device into another storage device such as a hard disk, random access memory (RAM), etc. The method form of the invention may be practiced by combining one or more machine-readable storage devices containing the code according to the present invention with appropriate standard computer hardware to execute the code contained therein. An apparatus for practicing the invention could be one or more processors and storage systems containing or network access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a variety of reference signals employed in wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A wireless subscriber communication apparatus, comprising:
    at least one antenna and a processor apparatus;
    a receiver apparatus configured to receive an assigned starting point index, an assigned reference signal bandwidth for a reference signal, and a hopping pattern parameter; and
    a transmitter apparatus configured to transmit the reference signal across a physical uplink shared channel multiple times, where the multiple transmissions begin at an initial resource block that is associated with the assigned starting point index and in accordance with the assigned reference signal bandwidth;

where the receiver apparatus is further configured to receive:
a total bandwidth assigned to the physical uplink shared channel; and where the processor apparatus is configured to:
determine at least one index point based on the hopping pattern parameter, a total number of resource blocks that correspond to the total bandwidth assigned to the physical uplink shared channel, and a number of resource blocks that correspond to the assigned reference signal bandwidth;

determine at least one subsequent resource block that is associated with the at least one index point based on the hopping pattern parameter, the total number of resource blocks that correspond to the total bandwidth assigned to the physical uplink shared channel, and the number of resource blocks that correspond to the assigned reference signal bandwidth;

cause assignment of a first plurality of resource blocks that start at the initial resource block, and the number of resource blocks within the first plurality of resource blocks that correspond to the assigned reference signal bandwidth;

cause assignment of at least a second plurality of resource blocks that start at the at least one subsequent resource block, and the number of resource blocks within at least the second plurality of resource blocks that correspond to the assigned reference signal bandwidth; and where the transmitter apparatus is configured to effect transmission of the first plurality of resource blocks with the second plurality of resource blocks via the at least one antenna.

2. The wireless subscriber communication apparatus of claim 1, wherein the reference signal comprises a sounding reference signal.

3. The wireless subscriber communication apparatus of claim 1, wherein the receipt of the assigned reference signal bandwidth for the reference signal comprises receipt of a parameter that is used by the subscriber station exclusively to determine a number of resource blocks associated with the assigned reference signal bandwidth.

4. The wireless subscriber communication apparatus of claim 1, wherein the total bandwidth assigned to the physical uplink shared channel varies over time.

5. The wireless subscriber station communication apparatus of claim 1, wherein:
the physical uplink shared channel is configured to expand based on a contraction of an uplink control channel;
the physical uplink shared channel is configured to contract based on an expansion of the uplink control channel; and
the uplink shared channel and the uplink control channel are included in an uplink channel.

6. The wireless subscriber communication apparatus of claim 1, wherein:
the transmission multiple times comprises transmission of the reference signal over a configured portion of the physical uplink shared channel;
the configured portion of the physical uplink shared channel corresponds to less than an entire bandwidth of the physical uplink shared channel;
at least one resource block included in the configured portion of the physical uplink shared channel is not sounded; and the at least one resource block is positioned between a second resource block and a third resource block, both the second resource block and the third resource block included in the configured portion of the physical uplink shared channel that is sounded.

7. The wireless subscriber communication apparatus of claim 1, wherein the receiver apparatus is further configured to:
receive a first indicator that indicates a first number of resource blocks in a first sounding bandwidth; and
receive a second indicator that indicates a second number of resource blocks in a second sounding bandwidth; and
wherein:
the second number is larger than the first number; and
the assigned reference signal bandwidth corresponds to one of the first sounding bandwidth or second sounding bandwidth.

8. A mobile wireless communication apparatus, comprising:
a receiver apparatus configured to receive an assigned starting point index and an assigned reference signal bandwidth for a reference signal, and a total bandwidth assigned to a shared channel;
where the reference signal comprises a sounding reference signal, and the shared channel comprises a physical uplink shared channel;
at least one antenna and a processing apparatus;
a transmitter apparatus configured to transmit the reference signal multiple times across the shared channel, the transmissions configured to begin at an initial resource block that is associated with the assigned starting point index and in accordance with the assigned reference signal bandwidth; and
where:
the receiver apparatus is further configured to receive:
a hopping pattern parameter;
the processing apparatus is configured to:
determine at least one index point based on the hopping pattern parameter, a total number of resource blocks corresponding to the total bandwidth assigned to the physical uplink shared channel, and a number of resource blocks corresponding to the assigned reference signal bandwidth;

determine at least one subsequent resource block that is associated with the at least one index point based on the hopping pattern parameter, the total number of resource blocks that correspond to the total bandwidth assigned to the physical uplink shared channel, and the number of resource blocks that correspond to the assigned reference signal bandwidth;

cause assignment of a first plurality of resource blocks that start at the initial resource block, and a number of resource blocks within the first plurality of resource blocks that correspond to the assigned reference signal bandwidth;

cause assignment of at least a second plurality of resource blocks that start at the at least one subsequent resource block, and a number of resource blocks within at least the second plurality of resource blocks that correspond to the assigned reference signal bandwidth; and the transmitter apparatus is configured to effect transmission of the first plurality of resource blocks with the second plurality of resource blocks via the at least one antenna.

9. The mobile wireless communication apparatus of claim 8, wherein the receipt of the assigned reference signal bandwidth for the reference signal comprises receipt of a parameter that is used by the mobile wireless communication apparatus to determine a number of resource blocks associated with the assigned reference signal bandwidth.

10. The mobile wireless communication apparatus of claim 8, wherein the total bandwidth assigned to the shared channel varies over time.

11. The mobile wireless communication apparatus of claim 8, wherein:
the shared channel is configured to expand based on a contraction of an uplink control channel;
the shared channel is configured to contract based on an expansion of the uplink control channel; and
the shared channel and the uplink control channel are included in an uplink channel.

12. The mobile wireless communication apparatus of claim 8, wherein:
the transmitter apparatus configured to transmit the reference signal multiple times across the shared channel is further configured to transmit the reference signal over a configured portion of the shared channel;
the configured portion of the shared channel corresponds to less than an entire bandwidth of the shared channel;
at least one resource block included in the configured portion of the shared channel is not sounded; and
the at least one resource block is positioned between a second resource block and a third resource block, both the second resource block and the third resource block included in the configured portion of the shared channel that is sounded.

13. The mobile wireless communication apparatus of claim 8, wherein the receiver apparatus is further configured to:
receive a first indicator that indicates a first number of resource blocks in a first sounding bandwidth; and
receive a second indicator that indicates a second number of resource blocks in a second sounding bandwidth; and
wherein:
the second number is larger than the first number; and
the assigned reference signal bandwidth corresponds to one of the first sounding bandwidth or second sounding bandwidth.

14. A method of operating a wireless subscriber communication apparatus, comprising:
receiving an assigned starting point index, an assigned reference signal bandwidth for a reference signal, and a hopping pattern parameter; and
transmitting the reference signal across a physical uplink shared channel multiple times, where the multiple transmissions begin at an initial resource block that is associated with the assigned starting point index and in accordance with the assigned reference signal bandwidth;
where the method further comprises:
receiving a total bandwidth assigned to the physical uplink shared channel; and
determining at least one index point based on the hopping pattern parameter, a total number of resource blocks that correspond to the total bandwidth assigned to the physical uplink shared channel, and a number of resource blocks that correspond to the assigned reference signal bandwidth;
determining at least one subsequent resource block that is associated with the at least one index point based on the hopping pattern parameter, the total number of resource blocks that correspond to the total bandwidth assigned to the physical uplink shared channel, and the number of resource blocks that correspond to the assigned reference signal bandwidth;
cause assignment of a first plurality of resource blocks that start at the initial resource block, and the number of resource blocks within the first plurality of resource blocks that correspond to the assigned reference signal bandwidth;
cause assignment of at least a second plurality of resource blocks that start at the at least one subsequent resource block, and the number of resource blocks within at least the second plurality of resource blocks that correspond to the assigned reference signal bandwidth; and
transmitting of the first plurality of resource blocks with the second plurality of resource blocks.

15. A method of operating a mobile wireless communication apparatus, comprising:
receiving an assigned starting point index and an assigned reference signal bandwidth for a reference signal, and a total bandwidth assigned to a shared channel;
where the reference signal comprises a sounding reference signal, and the shared channel comprises a physical uplink shared channel;
transmitting the reference signal multiple times across the shared channel, the transmissions configured to begin at an initial resource block that is associated with the assigned starting point index and in accordance with the assigned reference signal bandwidth; and
where the method further includes:
receiving a hopping pattern parameter;
determining at least one index point based on the hopping pattern parameter, a total number of resource blocks corresponding to the total bandwidth assigned to the physical uplink shared channel, and a number of resource blocks corresponding to the assigned reference signal bandwidth;
determining at least one subsequent resource block that is associated with the at least one index point based on the hopping pattern parameter, the total number of resource blocks that correspond to the total bandwidth assigned to the physical uplink shared channel, and the number of resource blocks that correspond to the assigned reference signal bandwidth;
cause assignment of a first plurality of resource blocks that start at the initial resource block, and a number of resource blocks within the first plurality of resource blocks that correspond to the assigned reference signal bandwidth;
cause assignment of at least a second plurality of resource blocks that start at the at least one subsequent resource block, and a number of resource blocks within at least the second plurality of resource blocks that correspond to the assigned reference signal bandwidth; and
transmitting the first plurality of resource blocks with the second plurality of resource blocks.

* * * * *